United States Patent [19]

Gatecliff et al.

[11] Patent Number: 4,834,632
[45] Date of Patent: May 30, 1989

[54] COMPRESSOR VALVE SYSTEM

[75] Inventors: George W. Gatecliff, Saline; Edwin L. Gannaway, Adrian, both of Mich.

[73] Assignee: Tecumseh Products Company, Tecumseh, Mich.

[21] Appl. No.: 147,817

[22] Filed: Jan. 25, 1988

[51] Int. Cl.$^4$ ............................................. F04B 39/10
[52] U.S. Cl. .................................... 417/534; 417/553; 417/570; 137/512.15; 137/516.15; 137/852
[58] Field of Search ................... 417/902, 410, 424 R, 417/534, 564, 569, 552, 553, 570, 523, 545, 562; 137/512.15, 516.15, 852; 123/193 H; 92/169.2, 60.5, 128

[56] References Cited

U.S. PATENT DOCUMENTS

| 109,732 | 11/1870 | Haskins | 417/553 |
|---|---|---|---|
| 156,873 | 11/1874 | Burleigh | 417/553 |
| 1,439,503 | 12/1922 | Clump et al. | 417/553 |
| 1,629,495 | 5/1927 | Frankenberg | 417/504 |
| 1,764,655 | 6/1930 | Spreen | 137/533.19 |
| 2,015,126 | 9/1935 | Replogle | 417/553 |
| 2,021,085 | 11/1935 | Orr . | |
| 2,035,854 | 3/1936 | Williams | 417/553 |
| 2,117,601 | 5/1938 | Browne | 417/553 |
| 2,139,313 | 12/1938 | Neubauer | 137/854 |
| 2,158,351 | 5/1939 | Ames et al. | 417/553 |
| 2,506,751 | 5/1950 | Trask | 417/550 |
| 2,970,608 | 2/1961 | Doeg | 137/516.11 |
| 3,070,122 | 12/1962 | Weatherhead et al. | 417/564 |
| 3,509,907 | 5/1970 | Gannaway | 417/902 |
| 3,587,406 | 6/1971 | Gannaway et al. | 92/74 |
| 3,807,907 | 4/1974 | Gannaway | 417/415 |
| 3,807,910 | 4/1974 | Paget | 417/564 |
| 3,836,290 | 9/1974 | Carter | 417/415 |
| 4,115,044 | 9/1978 | Gannaway | 417/564 |
| 4,231,394 | 11/1980 | Hrabal et al. | 137/512 |
| 4,257,457 | 3/1981 | Namura et al. | 137/851 |
| 4,358,251 | 11/1982 | Gannaway | 417/319 |
| 4,470,772 | 9/1984 | Gannaway | 417/368 |
| 4,492,127 | 1/1985 | Kuhn et al. | 417/902 X |
| 4,532,685 | 8/1985 | Itoh et al. | 29/156.4 R |

FOREIGN PATENT DOCUMENTS

56-99329  1/1983  Japan ................................. 417/564

Primary Examiner—Carlton R. Croyle
Assistant Examiner—Leonard P. Walnoha
Attorney, Agent, or Firm—Albert L. Jeffers; John F. Hoffman; David L. Ahlersmeyer

[57] ABSTRACT

A scotch yoke compressor assembly is disclosed wherein four radially disposed pistons reciprocate in cylinders defined in a crankcase. In a central portion of the crankcase, a scotch yoke mechanism operably couples the pistons to an eccentric portion on a rotating crankshaft. Each piston includes suction ports extending therethrough and a suction valve on the piston head. The suction valve is operably retained on a piston head and the piston is attached to a yoke member by a single bolt. The bolt head is received within a recess coined in a valve plate interposed between the crankcase and a cylinder head cover. Circularly arranged discharge ports in the valve plate are opened and closed by an annular discharge valve guidedly retained against the valve plate at diametrically opposed locations, by a combination of guide pins and an annular retainer member. The retainer member rides on the guide pins and is biased against the cylinder head cover and the discharge valve to permit extended lift during high mass flow rates and slugging.

11 Claims, 4 Drawing Sheets

COMPRESSOR VALVE SYSTEM

BACKGROUND OF THE INVENTION

The present invention relates generally to a reciprocating piston compressor assembly and, more particularly, to improvements in a valve system for such a compressor assembly having suction valving associated with the piston assembly and discharge valving associated with a valve plate closing the compression cylinder.

In a typical reciprocating piston compressor, a cylinder is defined by a compressor crankcase and a piston reciprocates within the cylinder to compress gaseous refrigerant therein. In a compressor to which the present invention pertains, the piston comprises a piston valve assembly wherein a suction valve is operably mounted to the piston head to receive gas through the piston from one end of the cylinder and compress the gas in the cylinder for discharge out the other end thereof. A valve plate is mounted to the crankcase so as to close the top of the cylinder. The valve plate includes a discharge valve assembly operable to discharge gas into a discharge space defined by a cylinder head cover mounted to the crankcase with the valve plate disposed therebetween.

A scotch yoke compressor includes a suction cavity defined within the crankcase into which a plurality of radially disposed cylinders open. A crankshaft is journalled in the crankcase and includes an eccentric portion located in the suction cavity to which the pistons and cylinders are operably coupled by means of a scotch yoke mechanism. In a typical scotch yoke coupling mechanism, where four radially disposed pistons are attached to a pair of U-shaped yokes, the piston bodies are attached to the yokes by means of threaded bolts, rivets, and the like. In addition, separate means are provided for retaining the suction valve components to the piston head. Such valve attachment means generally comprise bolts, rivets, bosses, and the like. The provision of separate means for attaching the piston member to the scotch yoke and for attaching suction valving to the piston head requires a plurality of parts and entails a higher degree of difficulty during compressor assembly.

In a compressor assembly having a piston valve assembly, as herein described, the suction valve retaining member generally includes a protruding portion such as a buttonhead which extends from the piston head toward the radially outward end of the cylinder. In order to reduce the amount of reexpansion volume remaining in the cylinder when the piston is at top dead center, it is desirable to have the piston travel as close to the valve plate covering the cylinder as is possible. To this end, any protrusion above the piston head top surface is preferably received within a recess in the valve plate.

Accordingly, the prior art devices having piston valve assemblies have provided for recesses mill cut into the valve plates covering the cylinders. However, these prior art devices require thicker valve plates and milling during manufacture of the valve plate to provide an adequate recess. With the requisite thicker valve plate, discharge ports extending through the valve plate are made longer, thereby increasing reexpansion volume associated therewith. Efforts to recess the discharge valve slightly into the top face of the valve plate have addressed these discharge port reexpansion problems, however, additional machining of the valve plate is required and the initial thickness of the valve plate must remain sufficient to provide the recess required by the piston valve assembly protrusion.

While the provision of a piston valve assembly in the aforementioned scotch yoke compressor provides additional room and flexibility for placement of a discharge valve assembly on the top surface of the valve plate, prior art discharge valve assembly designs have not taken full advantage of the additional space and flexibility. For instance, a typical discharge valve assembly includes an annular valve element for covering circularly arranged discharge ports in the valve plate. Heretofore, the space radially inwardly from the annular valve element has been used to provide a central guide on which the valve element rides to provide a retaining member to limit valve lift. In such an arrangement, the inside diameter is blocked and, accordingly, all discharge of gas is to the outside diameter of the discharge valve, thereby requiring greater valve lift which results in detrimental valving impact and noise.

SUMMARY OF THE INVENTION

The present invention overcomes the disadvantages of the above-described prior art valve systems for reciprocating piston compressors incorporating piston valve assemblies, by providing improved means for attaching the piston valve assembly to the yoke member of the scotch yoke mechanism, an improved valve plate design for receiving protrusions from the top face of the piston, and an improved discharge valve assembly on the top surface of the valve plate.

Generally, the invention, in one form thereof, provides a scotch yoke reciprocating piston compressor comprising a crankcase having radially disposed cylinders and pistons reciprocable therein attached to the eccentric portion of a rotating crankshaft by means of a scotch yoke mechanism. The pistons each comprise a piston valve assembly having a suction valve located on the piston head from which extends a protrusion received within a recess in a valve plate covering the radially outward end of the cylinder. Atop the cylinder is an annular discharge valve member which when opened permits discharge of compressed gas around both the inside and outside diameters of the valve member. In accord with the present invention, means are provided for both mounting the suction valve to the piston and for mounting the piston to a yoke member of the scotch yoke mechanism. Furthermore, a recess in a valve plate is provided which extends above the plane of the discharge valve seat on the top surface of the valve plate. Also, means are provided for retaining the discharge valve member to the top surface of the valve plate at a pair of locations diametrically opposed from one another. In such an arrangement, the valve member is free to flex at locations between the retaining locations such that voids are provided radially inwardly from the valve member.

More specifically, the invention provides, in one form thereof, a valve system for a scotch yoke compressor assembly wherein the suction valve located on the piston head is operably retained thereon by means of an elongated threaded member which also functions to secure the piston member to a yoke of the scotch yoke mechanism. The elongated member includes a buttonhead protrusion extending axially outwardly from the piston head surface. The buttonhead protrusion is received within a semispherical recess coined into a thin valve plate, whereby the recess extends above the plane of the top surface of the valve plate where the discharge valve seat is defined. Lastly, the invention provides, in one form thereof, for an annular discharge valve operably retained on the top surface of the valve plate by means of diametrically opposed dowel pins. The dowel pins guide the valve member as well as an annular retainer member which is spring biased against the inside surface of a cylinder head cover mounted over the valve plate. The retainer member provides sufficient force such that, during normal operation of the compressor, the discharge valve member is retained against the top surface of the valve plate. During excessive mass flow rates or during slugging of the compressor wherein hydraulic forces are created, the discharge valve retainer member allows the discharge valve element to lift slightly and ride on the dowel pins.

An advantage of the valve system of the present invention, and particularly the means for mounting the piston valve assembly to the scotch yoke mechanism, is that fewer parts are required and easier assembly is facilitated.

Another advantage of the valve system of the present invention is that the coined recess in the valve plate permits a thinner valve plate to be used, thereby reducing reexpansion volume in discharge ports communicating through the valve plate. Also, a thinner valve plate permits a larger diameter discharge port for the same reexpansion volume, thereby improving design flexibility in discharge port sizing.

Several advantages are realized over the prior art by the provision of the discharge valve assembly of the present invention wherein a void is created on the inside diameter of the annular valve member. These advantages include full use of the inside valve seat for better valve efficiency, and discharge of gas past both the outer and inner valve seat to reduce the required lift of the valve. By reducing the required lift of the valve, impact forces, stresses, and valve noise are reduced, and better efficiency is achieved.

A still further advantage of the discharge valve system in accordance with the present invention is that there is provided in addition to a normal discharge valve retainer mode, a high mass flow mode wherein the discharge valve retainer and discharge valve are lifted further than normal to achieve greater clearance.

Yet another advantage of the discharge valve system according to the present invention is that greater clearance is provided in the discharge space in the cylinder head cover.

The compressor assembly of the present invention, in one form thereof, provides a housing, a crankcase within the housing having a plurality of radially disposed cylinders, and a crankshaft rotatably journalled in the crankcase and having an eccentric portion. A plurality of pistons are reciprocable in respective cylinders, each piston having a suction opening therethrough. Also provided are valve means associated with each of the plurality of pistons for opening and closing the suction opening on the radially outer face of the piston. The valve means includes an axially guided valve member. Furthermore, a scotch yoke mechanism is operably associated with the eccentric portion and includes a reciprocating yoke member associated with each piston. In accordance with this form of the present invention, mounting means associated with each piston are provided for both mounting the valve means to the radially outer face of the piston and mounting the piston to the yoke member. The mounting means comprises a unitary elongated member attached at one end thereof to the yoke member, and operable at the other end thereof to guide and retain the valve member adjacent the radially outer face of the piston.

There is further provided, in one form of the present invention, a scotch yoke compressor including a housing, a crankcase within the housing, and a suction cavity included within the crankcase. A plurality of cylinders in the crankcase extend radially outwardly from the suction cavity. A crankshaft is rotatably journalled in the crankcase and has an eccentric portion located within the suction cavity. A scotch yoke mechanism is operably coupled to the eccentric portion. In accordance with this form of the present invention, there is provided a plurality of piston suction valve assemblies, wherein each assembly comprises a piston member reciprocable in a cylinder. The piston member has both a plurality of suction openings and a centerbore extending therethrough. Each piston assembly also includes a valve for opening and closing the suction openings on the radially outer face of the piston member. The valve means includes a valve member having an aperture therethrough. Furthermore, retainer means are provided for limiting the displacement of the valve member away from the radially outer face of the piston member during the opening of the suction openings. The retainer means includes a stop member having a diameter greater than the valve member aperture. Spacer means are also provided for spacing the stop member from the radially outer face a desired distance representing maximum valve member displacement. The spacer means includes a cylindrical guide member received within the valve member aperture such that the valve member is free floating along the guide member. An elongated rod extends through the piston centerbore, and has a threaded end portion threadedly engaged within a threaded hole in a yoke of the scotch yoke mechanism. The end of the rod opposite the threaded end extends radially outwardly beyond the stop member to operably retain the valve member, the guide member, and the stop member adjacent the radially outer face, and to secure the piston member to the scotch yoke mechanism.

The compressor assembly of the instant invention further provides, in one form thereof, a crankcase including a cylinder therein, the crankcase having a substantially planar top surface onto which the cylinder opens. A piston is provided which is reciprocable in the cylinder. A suction valve assembly on the top face of the piston comprises a valve member displaceable a fixed distance from the top face and a protuberance extending beyond the fixed distance. Also provided is a valve plate having substantially planar top and bottom surfaces. The valve plate is mounted to the crankcase top surface to thereby close the cylinder. The valve plate includes a discharge opening extending therethrough and communicating with a valve seat on the valve plate top surface. The valve plate further includes a raised portion extending above the valve plate top surface and defining a recess with respect to the valve plate bottom surface. The recess extends from the bottom surface to a depth above the plane of the valve plate top surface to receive the protuberance therein during reciprocation of the piston.

In one form of the present invention, there is further provided a compressor assembly having a crankcase including a cylinder therein, wherein the crankcase has a top surface onto which the cylinder opens. A valve plate is provided including a plurality of circularly arranged discharge openings extending therethrough. The discharge openings communicate between the cylinder and the top surface of the valve plate. A portion of the valve plate top surface immediately adjacent the discharge openings comprises a valve seat. A cylinder head cover is perimetrically mounted to the crankcase top surface with the valve plate interposed therebetween. Furthermore, the valve plate top surface and the cover define a discharge space. A piston is reciprocable in the cylinder to compress gaseous refrigerant for discharging through the discharge openings into the discharge space. The compressor assembly according to this form of the invention also includes an annular flexible discharge valve member overlying the plurality of discharge openings. In accordance with this form of the invention, means are provided for retaining the valve member against the adjacent valve seat at a pair of locations diametrically opposed from one another such that the valve member is free to flex between the pair of locations to a limited open position. Respective fluid flow paths are provided radially inwardly and radially outwardly from the open annular valve member. Accordingly, unimpeded flow of compressed gas refrigerant is permitted radially inwardly and radially outwardly around the valve member into the discharge space. In this way, the necessary displacement of the valve member to the open position is minimized.

DESCRIPTION OF THE PREFERRED EMBODIMENT

Figure 1:
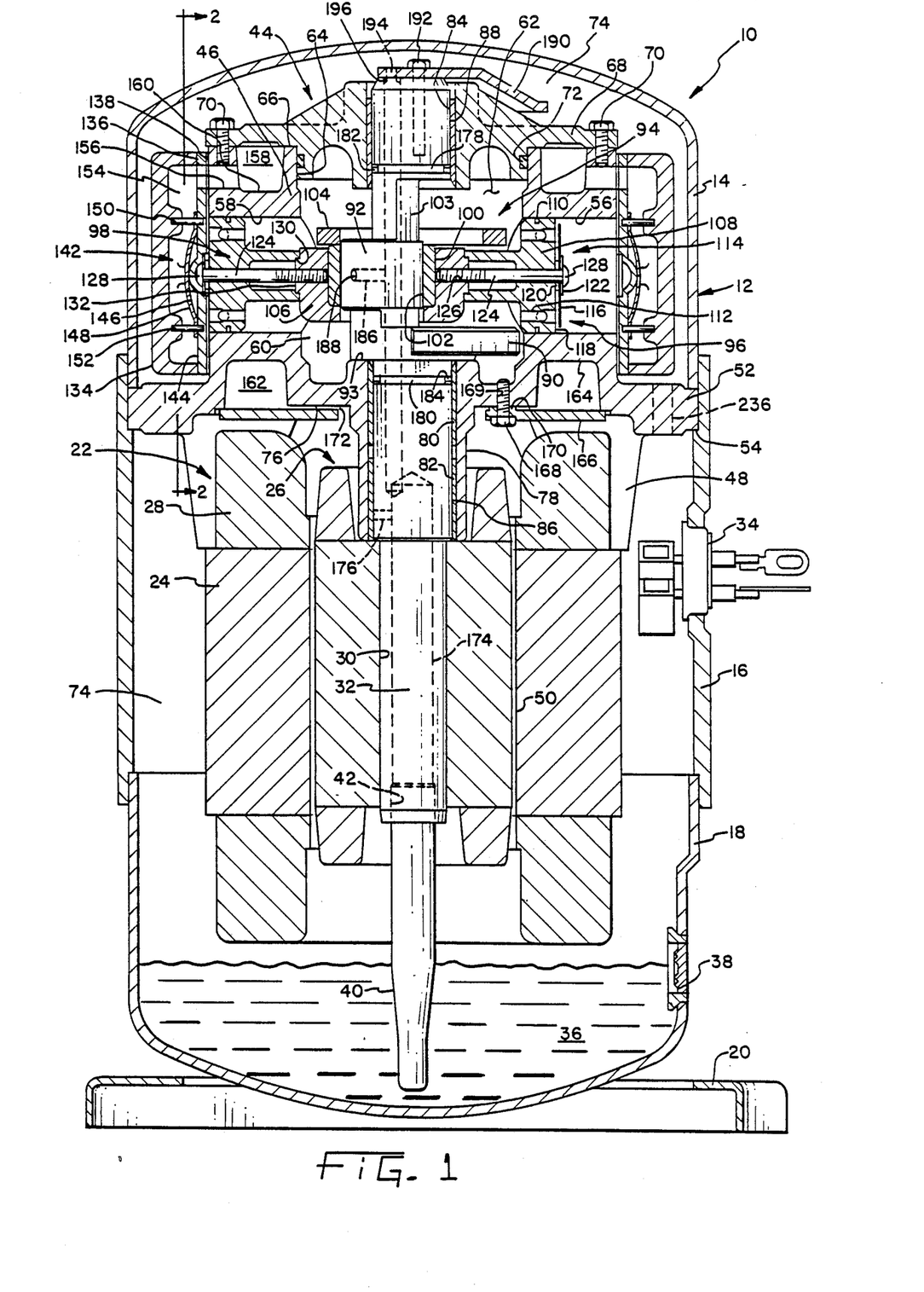
FIG. 1 is a side sectional view of a compressor of the type to which the present invention pertains.

In an exemplary embodiment of the invention as shown in the drawings, and in particular by referring to FIG. 1, a compressor assembly 10 is shown having a housing generally designated at 12. The housing has a top portion 14, a central portion 16, and a bottom portion 18. The three housing portions are hermetically secured together as by welding or brazing. A mounting flange 20 is welded to the bottom portion 18 for mounting the compressor in a vertically upright position. Located within hermetically sealed housing 12 is an electric motor generally designated at 22 having a stator 24 and a rotor 26. The stator is provided with windings 28. Rotor 26 has a central aperture 30 provided therein into which is secured a crankshaft 32 by an interference fit. A terminal cluster 34 is provided in central portion 16 of housing 12 for connecting the compressor to a source of electric power. Where electric motor 22 is a three-phase motor, bidirectional operation of compressor assembly 10 is achieved by changing the connection of power at terminal cluster 34.

Compressor assembly 10 also includes an oil sump 36 located in bottom portion 18. An oil sight glass 38 is provided in the sidewall of bottom portion 18 to permit viewing of the oil level in sump 36. A centrifugal oil pick-up tube 40 is press fit into a counterbore 42 in the end of crankshaft 32. Oil pick-up tube 40 is of conventional construction and includes a vertical paddle (not shown) enclosed therein.

Also enclosed within housing 12, in the embodiment of FIG. 1, is a compressor mechanism generally designated at 44. Compressor mechanism 44 comprises a crankcase 46 including a plurality of mounting lugs 48 to which motor stator 24 is attached such that there is an annular air gap 50 between stator 24 and rotor 26. Crankcase 46 also includes a circumferential mounting flange 52 axially supported within an annular ledge 54 in central portion 16 of the housing. A bore 236 extends through flange 52 to provide communication between the top and bottom ends of housing 12 for return of lubricating oil and equalization of discharge pressure within the entire housing interior.

Compressor mechanism 44, as illustrated in the preferred embodiment, takes the form of a reciprocating piston, scotch yoke compressor. More specifically, crankcase 46 includes four radially disposed cylinders, two of which are shown in FIG. 1 and designated as cylinder 56 and cylinder 58. The four radially disposed cylinders open into and communicate with a central suction cavity 60 defined by inside cylindrical wall 62 in crankcase 46. A relatively large pilot hole 64 is provided in a top surface 66 of crankcase 46. Various compressor components, including the crankshaft, are assembled through pilot hole 64. A top cover such as cage bearing 68 is mounted to the top surface of crankcase 46 by means of a plurality of bolts 70 extending through bearing 68 into top surface 66. When bearing 68 is assembled to crankcase 46, an O-ring seal 72 isolates suction cavity 60 from a discharge pressure space 74 defined by the interior of housing 12.

Crankcase 46 further includes a bottom surface 76 and a bearing portion 78 extending therefrom. Retained within bearing portion 78, as by press fitting, is a sleeve bearing assembly comprising a pair of sleeve bearings 80 and 82. Two sleeve bearings are preferred rather than a single longer sleeve bearing to facilitate easy assembly into bearing portion 78. Likewise, a sleeve bearing 84 is provided in cage bearing 68, whereby sleeve bearings 80, 82, and 84 are in axial alignment. Sleeve bearings 80, 82, and 84 are manufactured from steel-backed bronze.

A sleeve bearing, as referred to herein, is defined as a generally cylindrical bearing surrounding and providing radial support to a cylindrical portion of a crankshaft, as opposed to a thrust bearing which provides axial support for the weight of the crankshaft and associated parts. A sleeve bearing, for example, may comprise a steel-backed bronze sleeve insertable into a crankcase, or a machined cylindrical surface made directly in the crankcase casting or another frame member.

Referring once again to crankshaft 32, there is provided thereon journal portions 86 and 88, wherein journal portion 86 is received within sleeve bearings 80 and 82, and journal portion 88 is received within sleeve bearing 84. Accordingly, crankshaft 32 is rotatably journalled in crankcase 46 and extends through a suction cavity 60. Crankshaft 32 includes a counterweight portion 90 and an eccentric portion 92 located opposite one another with respect to the central axis of rotation of crankshaft 32 to thereby counterbalance one another. The weight of crankshaft 32 and rotor 26 is supported on thrust surface 93 of crankcase 46.

Eccentric portion 92 is operably coupled by means of a scotch yoke mechanism 94 to a plurality of reciprocating piston assemblies corresponding to, and operably disposed within, the four radially disposed cylinders in crankcase 46. As illustrated in FIG. 1, piston assemblies 96 and 98, representative of four radially disposed piston assemblies operable in compressor assembly 10, are associated with cylinders 56 and 58, respectively.

Scotch yoke mechanism 94 comprises a slide block 100 including a cylindrical bore 102 in which eccentric portion 92 is journalled. In the preferred embodiment, cylindrical bore 102 is defined by a steel backed bronze sleeve bearing press fit within slide block 100. A reduced diameter portion 103 in crankshaft 32 permits easy assembly of slide block 100 onto eccentric portion 92. Scotch yoke mechanism 94 also includes a pair of yoke members 104 and 106 which cooperate with slide block 100 to convert rotating motion of crankshaft 32 and eccentric portion 92 to reciprocating movement of the four radially disposed piston assemblies. For instance, FIG. 1 shows yoke member 106 coupled to piston assemblies 96 and 98, whereby when piston assembly 96 is at a bottom dead center (BDC) position, piston assembly 98 will be at a top dead center (TDC) position.

Figure 9:
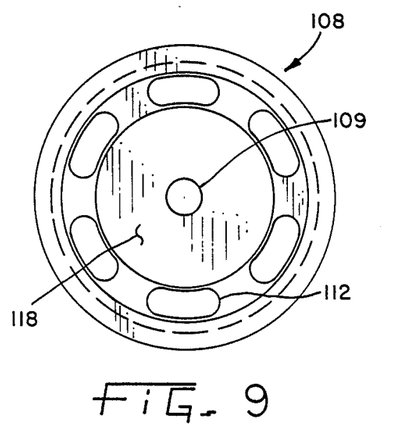
FIG. 9 is a view of the radially outer end of a piston of the compressor of FIG. 1.

Referring once again to piston assemblies 96 and 98, each piston assembly comprises a piston member 108 having an annular piston ring 110 to allow piston member 108 to operably reciprocate within a cylinder to compress gaseous refrigerant therein. Referring more specifically to FIG. 9, piston member 108 also includes a mounting centerbore 109 extending therethrough. A plurality of suction ports 112 are circularly arranged about centerbore 109 and extend through piston member 108 to allow suction gas within suction cavity 60 to enter cylinder 56 on the compression side of piston 108.

Figure 10:
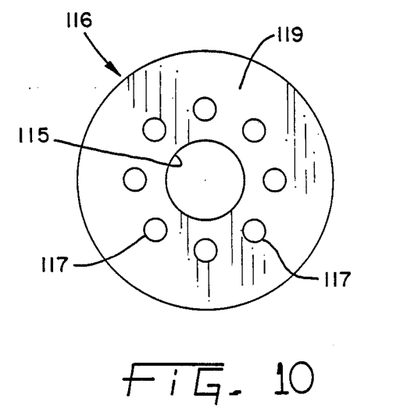
FIG. 10 is a front view of a suction valve of the compressor of FIG. 1, particularly shown as it would be mounted to the outer end of the piston of FIG. 9.

In accord with the present invention, a suction valve assembly 114 is associated with each piston assembly, and will now be described with respect to piston assembly 96 shown in FIGS. 1 and 5. Suction valve assembly 116 comprises a flat, disk-shaped suction valve 116 (FIG. 10) having an annular closure portion 119. In its closed position, valve 116 covers suction ports 112 on outer top surface 118 of piston member 108 (FIG. 9). As shown in FIG. 10, valve 116 includes a central guide aperture 115 and a plurality of openings 117 circularly arranged about aperture 115 and radially inwardly from closure portion 119. Openings 117 allow suction gas entering through suction ports 112 to be directed around the outside and inside diameters of closure portion 119, thus reducing the amount of valve lift required. Suction valve 116 opens and closes by virtue of fluid pressure forces and/or its own inertia as piston assembly 96 reciprocates in cylinder 56.

More specifically, suction valve 116 is mounted circumjacent a guide member, such as cylindrical spacer 120, i.e., spacer 120 is received within aperture 115. In operation, valve 116 slidingly rides along spacer 120 and is limited in its travel to an open position by a valve retainer, such as washer 122. Spacer 120 consists of cold-rolled or case-hardened steel, while washer 122 is made from spring steel. In the preferred embodiment, valve 116 is free to travel approximately 0.050 inches.

Figure 5:
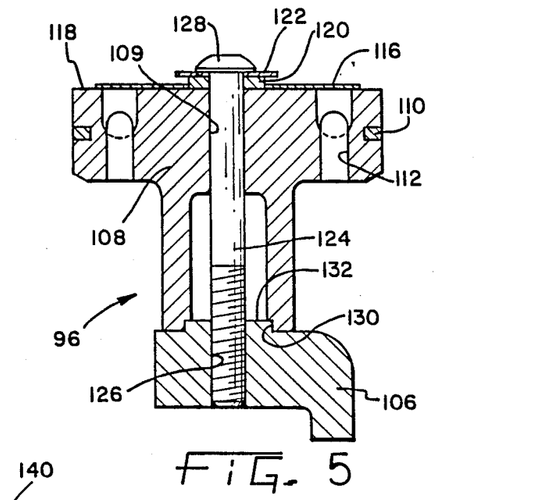
FIG. 5 is an enlarged sectional view of a piston assembly of the compressor of FIG. 1, in accord with the present invention, particularly showing attachment of the piston assembly to a yoke member.

As illustrated in FIGS. 1 and 5, washer 122, suction valve 116, and spacer 120 are secured to top surface 118 of piston member 108 by an elongated threaded bolt 124 having a buttonhead 128. In the disclosed embodiment, the diameter of buttonhead 128 is greater than the diameter of the aperture in washer 122, which in turn is less than the outside diameter of spacer 120. Likewise, the outside diameter of washer 122 is greater than the diameter of guide aperture 115 in suction valve 116. Accordingly, washer 122 is retained between buttonhead 128 and spacer 120, while suction valve 116 is guidingly retained along spacer 120 between washer 122 and top surface 118.

With respect to the attachment of each piston assembly to a respective yoke member in accordance with the present invention, reference will be made to piston assemblies 96 and 98, and yoke member 106. Threaded bolt 124 is received within a threaded hole 126 in yoke member 106 to secure piston assembly 96 thereto. More specifically, as illustrated with respect to piston assembly 96 in FIG. 5, an annular recess 130 is provided in each piston member and a complementary boss 132 is provided on the corresponding yoke member, whereby boss 132 is received within recess 130 to promote positive, aligned engagement therebetween.

A discharge valve system in accord with the present invention will now be described in further detail with reference made to the drawings. Generally, compressed gaseous refrigerant within each cylinder is discharged through discharge ports in a valve plate. With reference to cylinder 58 in FIG. 1, a cylinder head cover 134 is mounted to crankcase 46 with a valve plate 136 interposed therebetween. A valve plate gasket 138 is provided between valve plate 136 and crankcase 46 to maintain clearance between suction valve 116 and a bottom surface 137 of valve plate 136 when the piston assembly is positioned at top dead center (TDC).

Figure 3:
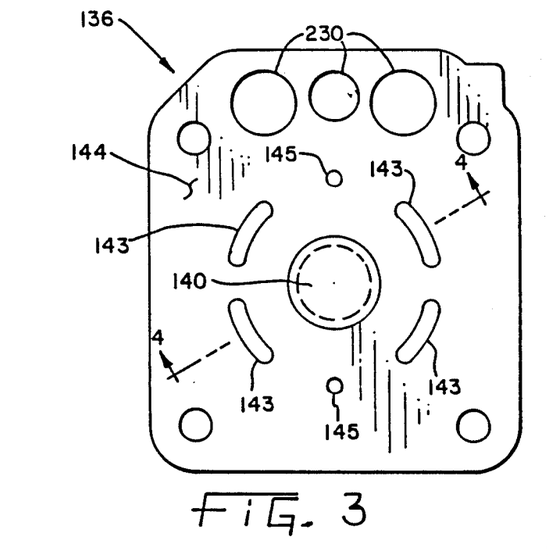
FIG. 3 is an enlarged front view of the valve plate as shown in FIG. 2.
Figures 6, 7, 8:
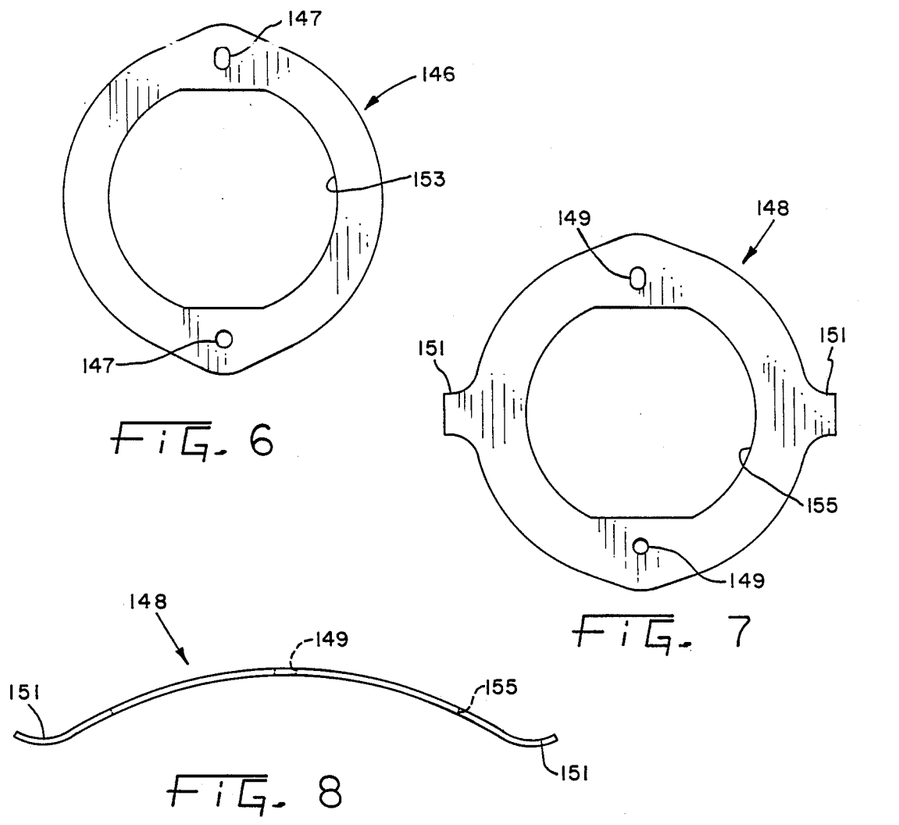
FIG. 6 is an enlarged front view of the discharge valve as shown in FIG. 2.
FIG. 7 is an enlarged front view of the discharge valve retainer as shown in FIG. 2.
FIG. 8 is a top view of the discharge valve retainer of FIG. 7.

A discharge valve assembly 142 in accord with the present invention is situated on a top surface 144 of valve plate 136. Generally, compressed gas is discharged through a plurality of circularly arranged discharge ports 143 in valve plate 136 (FIG. 3), past an open discharge valve 146 (FIG. 6) that is limited in its travel by a discharge valve retainer 148 (FIG. 7). Discharge valve 146 is a flat, annular valve made of thin valve steel, while valve retainer 148 is an annular, arcuate spring steel member corresponding substantially to the shape of discharge valve 146. Valve 146 includes a central aperture 153 and valve retainer 148 includes a corresponding central aperture 155, whereby a void is provided radially inwardly therefrom.

A pair of guide pins 150, 152 extend from valve plate 136 to underside 133 cylinder head cover 134. For ease of assembly, guide pins 150, 152 are first press fit into a pair of holes 145 in valve plate 136 and are then captured within corresponding holes in cylinder head cover 134 as by a slip fit. Guide pins 150, 152 guidingly engage pairs of holes 147, 149 in discharge valve 146 and discharge valve retainer 148, respectively, at diametrically opposed locations therein. One hole in each of hole pairs 147, 149 may take the form of an oval slot to compensate for tolerances in the hole locations during stamping, and tolerance variations in the distance between guide pin locations.

Figure 11:
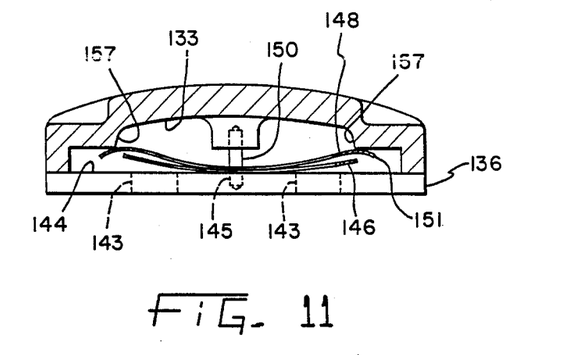
FIG. 11 is an enlarged sectional view of the discharge valve assembly of FIGS. 1 and 2, in accord with the present invention, taken along the line 11—11 in FIG. 2 and viewed in the direction of the arrows, particularly showing the position of the discharge valve and retainer during normal operating conditions.
Figure 12:
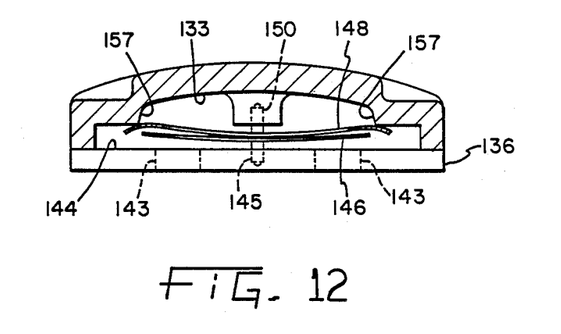
FIG. 12 is the discharge valve assembly of FIG. 11 shown with the discharge valve and retainer in a position during high mass flow rates of discharge fluid.

In accord with the preferred embodiment of the discharge valve system of the present invention, a pair of diametrically opposed, radially extending ears 151 on valve retainer 148 contacts and is biased against a corresponding pair of bosses 157 on the underside 133 of cylinder head cover 134 to normally retain discharge valve 146 against top surface 144 at the diametrically opposed locations (FIG. 11). However, valve 146 and retainer 148 are capable of being guidedly lifted away from top surface 144 along guide pins 150 and 152 in response to excessively high mass flow rates of discharge gas, or hydraulic pressures caused by slugging (FIG. 12).

During operation of compressor 10 and, more particularly, the discharge valve system in accord with the present invention, the fluid flow path of the discharged gaseous refrigerant is past both the inside and outside diameters of annular valve 146 and valve retainer 148. More particularly, gaseous refrigerant is permitted to be discharged through central apertures 153, 155 of discharge valve 146 and valve retainer 148, respectively. The total cross-sectional area through which gas is permitted to be discharged around valve 146 is calculated by multiplying the sum of the inside and outside circumferences of the valve by the valve lift. It can be seen that by providing discharge past the inside diameter of annular valve 146, required valve lift can be greatly reduced.

Valve plate 136 also includes a recess 140 into which buttonhead 128 of threaded bolt 124 is received when piston assembly 98 is positioned at TDC. In the preferred embodiment of the present invention shown in FIG. 4, recess 140 takes the form of a semispherical relief 139 coined in valve plate 136 after grinding and lapping. More specifically, a mill cut approximately 0.080–0.085 is made in valve plate 136, after which relief 139 is coined as by stamping or punching. In this manner of formation, recess 140 provides the minimum clearance volume for buttonhead 128 and washer 122. Specifically, buttonhead 128 and washer 122 fit within relief 139 and mill cut 141, respectively, when the piston assembly is at TDC position. It is appreciated that while the preferred embodiment of the present invention provides for a recess to be coined in a thin iron or steel valve plate, a recess as characterized herein may also be provided by a valve plate manufactured from powdered metal or the like.

Figure 4:
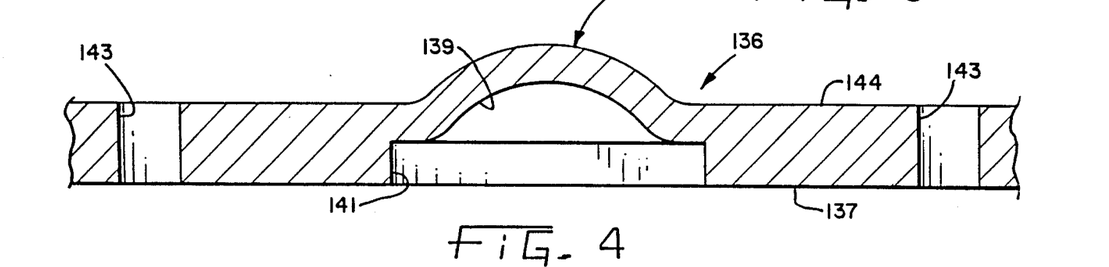
FIG. 4 is an enlarged fragmentary sectional view of the valve plate of FIG. 3 taken along the line 4—4 in FIG. 3 and viewed in the direction of the arrows.

It is significant to note that relief 139 extends from bottom surface 137 to a depth beyond a plane defined by top surface 144. Therefore, the valve plate in accord with the present invention need not have an overall thickness greater than the depth of recess 140. Accordingly, valve plate thickness is reduced and reexpansion volume in discharge ports 143 is minimized.

Referring once again to cylinder head cover 134, a discharge space 154 is defined by the space between top surface 144 of valve plate 136 and the underside of cylinder head cover 134. Cover 134 is mounted about its perimeter to crankcase 46 by a plurality of bolts 135, shown in FIG. 2. Discharge gas within discharge space 154 associated with each respective cylinder passes through a respective connecting passage 156, thereby providing communication between discharge space 154 and a top annular muffling chamber 158. Chamber 158 is defined by an annular channel 160 formed in top surface 66 of crankcase 46, and cage bearing 68. As illustrated, connecting passage 156 passes not only through crankcase 46, but also through holes in valve plate 136 and valve plate gasket 138.

Top muffling chamber 158 communicates with a bottom muffling chamber 162 by means of passageways extending through crankcase 46. Chamber 162 is defined by an annular channel 164 and a muffler cover plate 166. Cover plate 166 is mounted against bottom surface 76 at a plurality of circumferentially spaced locations by bolts 168 and threaded holes 169. Bolts 168 may also take the form of large rivets or the like. A plurality of spacers 170, each associated with a respective bolt 168, space cover plate 166 from bottom surface 76 at the radially inward extreme of cover plate 166 to form an annular exhaust port 172. The radially outward extreme portion of cover plate 166 is biased in engagement with bottom surface 76 to prevent escape of discharge gas from within bottom muffling chamber 162 at this radially outward location.

Compressor assembly 10 of FIG. 1 also includes a lubrication system associated with oil pick-up tube 40 previously described. Oil pick-up tube 40 acts as an oil pump to pump lubricating oil from sump 36 upwardly through an axial oil passageway 174 extending through crankshaft 32. An optional radial oil passageway 176 communicating with passageway 174 may be provided to initially supply oil to sleeve bearing 82. The disclosed lubrication system also includes annular grooves 178 and 180 formed in crankshaft 32 at locations along the crankshaft adjacent opposite ends of suction cavity 60 within sleeve bearings 80 and 84. Oil is delivered into annular grooves 178, 180 behind annular seals 182, 184, respectively retained therein. Seals 182, 184 prevent high pressure gas within discharge pressure space 74 in the housing from entering suction cavity 60 past sleeve bearings 84 and 80, 82, respectively. Also, oil delivered to annular grooves 178, 180 behind seals 182 and 184 lubricate the seals as well as the sleeve bearings.

Another feature of the disclosed lubrication system of compressor assembly 10 in FIG. 1, is the provision of a pair of radially extending oil ducts 186 from axial oil passageway 174 to a corresponding pair of openings 188 on the outer cylindrical surface of eccentric portion 92.

A counterweight 190 is attached to the top of shaft 32 by means of an off-center mounting bolt 192. An extruded hole 194 through counterweight 190 aligns with axial oil passageway 174, which opens on the top of crankshaft 32 to provide an outlet for oil pumped from sump 36. An extruded portion 196 of counterweight 190 extends slightly into passageway 174 which, together with bolt 192, properly aligns counterweight 190 with respect to eccentric portion 92.

Figure 2:
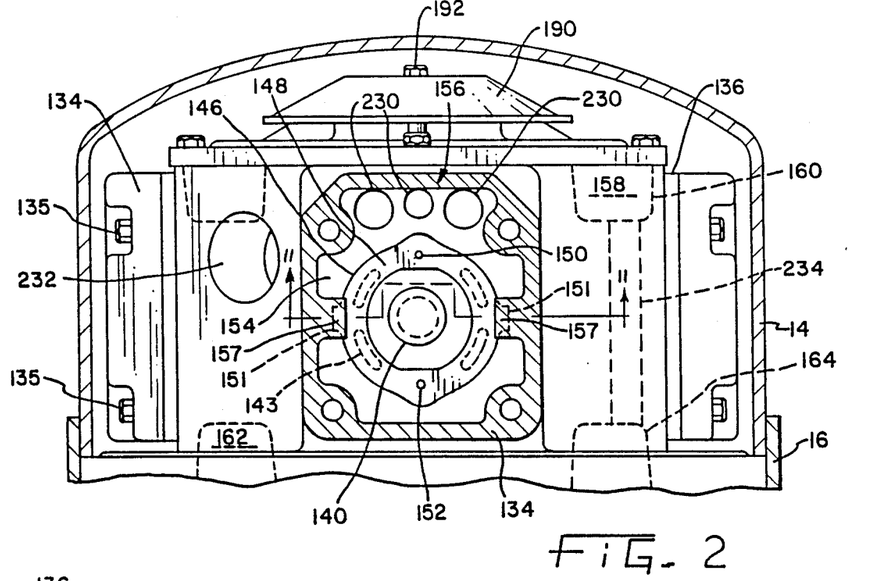
FIG. 2 is a fragmentary sectional view of the compressor of FIG. 1 taken along the line 2—2 in FIG. 1 and viewed in the direction of the arrows.

Referring once again to FIG. 2, connecting passage 156 is shown as comprising a plurality of bores 230, associated with each radially disposed cylinder arrangement, to connect between discharge space 154 within cylinder head cover 134 and top muffling chamber 158. Also shown in FIG. 2 is a suction inlet opening 232 included in crankcase 46, providing communication between the outside of the crankcase and suction cavity 60 defined therein. One of three gas passageways 234 is shown extending through crankcase 46 and providing communication between top muffling chamber 158 and bottom muffling chamber 162. In the preferred embodiment, the combined cross-sectional area of gas passageways 234 is made approximately equal to that of bores 230 associated with one cylinder to avoid pressure drops.

It will be appreciated that the foregoing is presented by way of illustration only, and not by way of any limitation, and that various alternatives and modifications may be made to the illustrated embodiment without departing from the spirit and scope of the invention.

What is claimed is:

1. A compressor assembly, comprising:
    a crankcase including a cylinder therein, said crankcase having a substantially planar top surface onto which said cylinder open;
    a piston reciprocable in said cylinder;
    a suction valve assembly on the top face of said piston, said suction valve assembly comprising a suction valve member displaceable a fixed distance from said top face and a protuberance extending beyond said fixed distance;
    a valve plate having substantially planar top and bottom surfaces, said valve plate being mounted to said crankcase top surface to thereby close said cylinder, said valve plate including a discharge opening extending therethrough and communicating with a valve seat on said valve plate top surface, said valve plate further including a raised portion extending above said valve plate top surface and defining a recess with respect to said valve plate bottom surface extending therefrom to a depth above the plane of said valve plate top surface to receive said protuberance therein during reciprocation of said piston, thereby minimizing the required thickness of the valve plate and reducing reexpansion volume associated with said discharge opening; and
    a discharge valve assembly on said valve plate top surface, said discharge valve assembly comprising an annular discharge valve member, said discharge valve member overlying said valve seat and circumscribing said raised portion.

2. The compressor assembly of claim 1 in which:
    said raised portion is a semispherical stamping made in said valve plate bottom surface and extending above said valve plate top surface, thereby defining said recess as semispherical.

3. The compressor assembly of claim 2 in which:
    said protuberance is a substantially semispherical buttonhead, said buttonhead being received within said recess.

4. The compressor assembly of claim 1 in which:
    said discharge opening comprises a plurality of discharge ports circumferentially arranged about said raised portion.

5. The compressor assembly in claim 1 in which:
    said recess is substantially semispherical and includes a counterbore on said valve plate bottom surface.

6. The compressor assembly of claim 1 in which:
    said protuberance comprises a substantially semispherical buttonhead and an annular flange, and said recess is substantially semispherical and includes a counterbore on said valve plate bottom surface, said buttonhead being received within said recess and said flange being received within said counterbore.

7. A compressor assembly, comprising:
    a crankcase including a cylinder therein, said crankcase having a top surface onto which said cylinder opens;
    a valve plate including a plurality of circularly arranged discharge openings extending therethrough communicating between said cylinder and the top surface of said valve plate, a portion of said valve plate top surface immediately adjacent said discharge openings comprising a valve seat;
    a piston reciprocable in said cylinder to compress gaseous refrigerant for discharging through said discharge openings into said discharge space;
    an annular flexible discharge valve member overlying said plurality of discharge openings;
    a cylinder head cover mounted about a perimeter thereof to said crankcase top surface with said valve plate interposed therebetween, said cylinder head cover being spaced from an outer perimeter of said discharge valve member, said valve plate and said cylinder head cover defining a discharge space; and
    means for retaining said valve member against said adjacent valve seat at a pair of locations diametrically opposed from one another such that said valve member is free to flex between said pair of locations to a limited open position, and such that respective fluid flow paths are provided radially inwardly and radially outwardly from said open annular valve member, whereby unimpeded flow of compressed gas refrigerant is permitted radially inwardly and radially outwardly around said valve member into said discharge space, thereby minimizing the necessary displacement of said valve member to said open position.

8. The compressor assembly of claim 7 in which:
    said retaining means comprises an arcuate annular valve retainer which contacts against said valve member at said diametrically opposed locations and has a pair of opposed upwardly curving portions that curve upwardly from said valve plate between said locations.

9. The compressor assembly of claim 8 in which:
    each of said valve member and said valve retainer includes a pair of openings extending therethrough at said diametrically opposed locations, said respective pairs of openings in said valve member and said valve retainer being substantially aligned; and
    said retaining means further comprising a pair of guide pins extending upwardly from said valve plate through said respective pairs of openings in said valve member and said valve retainer.

10. The compressor assembly of claim 8 in which:
    said upwardly curving portions contact said cylinder head cover such that said valve retainer is in biased engagement with said valve member against said adjacent valve seat at said diametrically opposed locations.

11. The compressor assembly of claim 10 in which:
    said valve retainer includes a pair of radially outwardly extending ear portions, said pair of ear portions contacting said cylinder head cover.

* * * * *